United States Patent Office 3,488,064
Patented Jan. 6, 1970

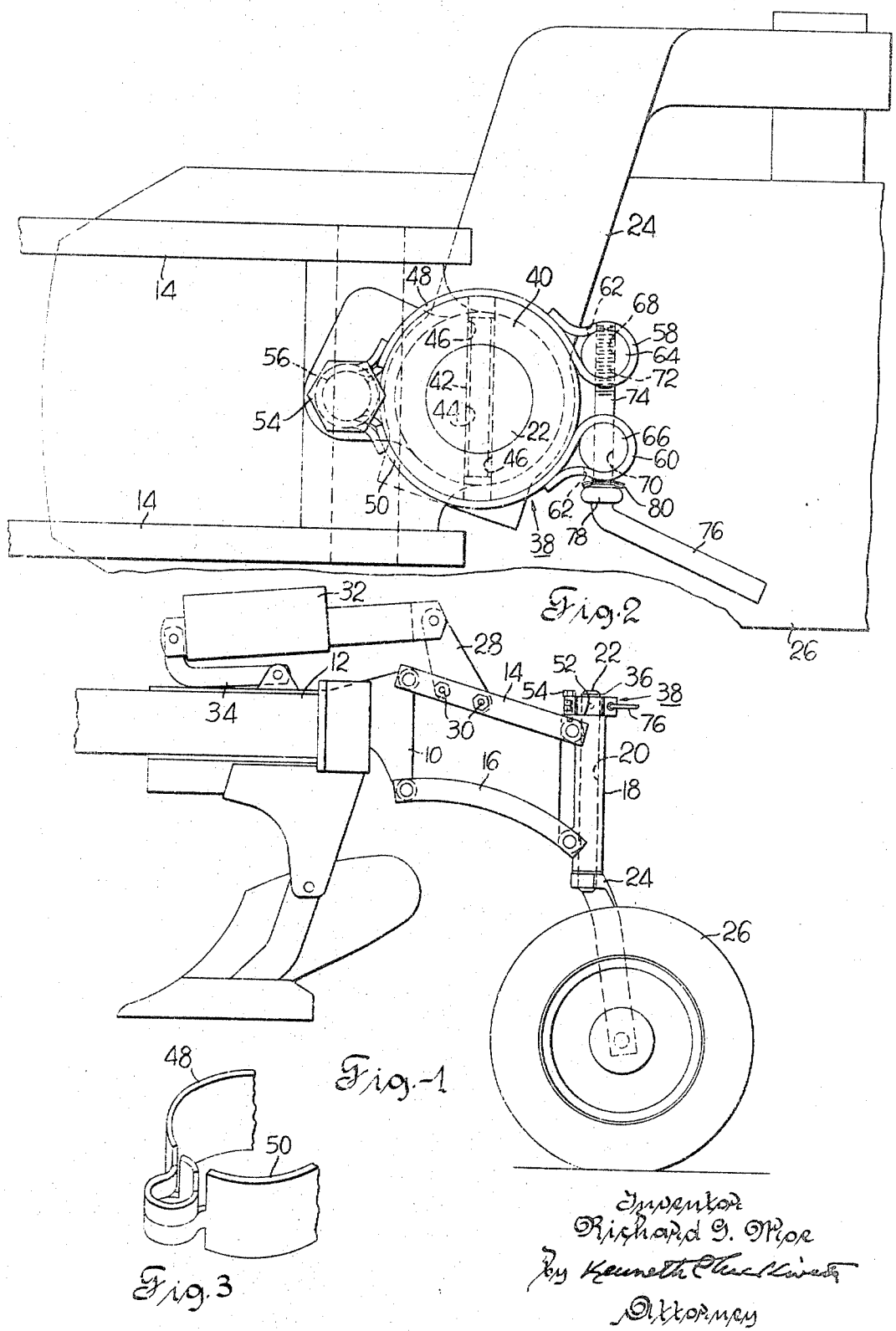

3,488,064
IMPLEMENT CASTER WHEEL
Richard G. Moe, New Berlin, Wis., assignor to Allis-Chalmers Manufacturing Company, Milwaukee, Wis.
Filed Mar. 6, 1968, Ser. No. 710,816
Int. Cl. B60g 1/00
U.S. Cl. 280—80     6 Claims

ABSTRACT OF THE DISCLOSURE

This disclosure is relative to a castering wheel provided with an adjustable motion retarding device for limiting the castering of such wheel or preventing it entirely.

---

The present invention relates generally to agricultural implements and is more particularly concerned with implements employing one or more caster wheels serving to support the implement frame while operating in the field or when transporting the implement on the highway.

It is well known in the implement art to provide caster wheels of the above type with means to adjust their resistance to castering and to additionally provide separate locking means to prevent castering of the wheel. This has normally required two separate operations independently performed with the motion retarding device suppling limited braking action, range of adjustment and wear life.

An object of this invention is to provide an improved caster wheel for agricultural purposes such as plows wherein novel means have been devised allowing for an infinite range of resistance to castering so that during transport of the plow, the caster wheel can be adjusted to trail correctly at all times without whipping or wobbling.

A further object of this invention is to provide a single device for adjusting the resistance to the wheel castering and which device can be selectively adjusted to effectively lock the caster wheel against castering movement.

A further object of this invention is to provide a novel motion retarding device for caster wheels which can be manually adjusted without the use of tools.

A still further object of the invention is to provide a caster wheel brake drum formed entirely of friction material to eliminate bonding or riveting and thereby extend the service life of the brake.

A still further object of this invention is to provide a caster wheel assembly of the type and purpose mentioned above which is capable of obtaining the objectives noted, the wheel being of simple and rugged construction, of economical manufacture, and of extended service life and easy maintenance.

Referring now to the drawing:

FIG. 1 is a side elevation of the rear portion of a plow utilizing the subject invention;

FIG. 2 is an enlarged plan view of a fragment of the structure shown in FIG. 1; and, FIG. 3 is an enlarged isometric view of the brake bands used in this invention.

Referring to FIG. 1, a bracket 10 rigidly secured to the rearward end of plow frame 12, pivotally supports two pair of rearwardly extending and vertically spaced parallel links 14 and 16. A sleeve or boot casting 18 is pivotally mounted between the rearward ends of parallel links 14 and 16 and rotatably receives within its vertical bore 20 an axle member 22. An arm 24 rigidly secured, as by welding, to the lower end of the axle or spindle member 22, has a caster wheel 26 rotatably mounted thereon in a conventional manner. The parallel linkage 14, 16 is actuated by means of an arm 28 rigidly secured, as by bolts 30, between the upper links 14. The arm 28 is operatively connected to a hydraulic lifting cylinder 32 to effect raising and lowering of the caster wheel 26. The cylinder 32 is pivotally supported on the plow frame 12 by means of the usual swinging ram anchor 34.

The axle member 22 extends upwardly beyond the upper end of the sleeve casting 18 and this upper end portion 36 mounts a brake assembly 38. Referring to FIG. 2, a component of assembly 38 namely cylindrical collar or drum 40 is secured to the upper end portion 36 of the axle member 22 by means of roll pin 42 which pin is received in aligned horizontally extending passageways 44 and 46 in the axle and drum respectively. It is to be noted that the length of roll pin 42 is considerably less than the diameter of drum 40 thereby permitting drum 40 to wear a considerable amount before the ends of the pin would be contacted. The relatively large drum 40 is entirely formed of very dense friction material which provides increased braking surface, greater wear and eliminates the necessity of bonding friction material to the bands.

Surrounding the cylindrical drum 40 is a pair of brake bands 48 and 50 which are pivotally hinged together and mounted on the upper end 52 (see FIG. 1) of sleeve casting 18 by means of cap screw 54 received by threaded opening 56 (see FIG. 2) in sleeve casting 18. The opposite free ends of the brake bands 48 and 50 are formed so as to present closed loops 58 and 60, respectively, with each of such loops being provided with horizontally extending slots 62. Vertically extending pins 64 and 66 are pivotally received by the brake band loops 58 and 60, respectively, and these pins are provided with passageways 68 and 70, respectively, which are in horizontal alignment with the slots 62 in the bands 48 and 50. The threaded portion 72 of an adjusting screw 74 unites the free ends 58 and 60 of the brake bands with such adjusting screw being received in passageway 70 in pin 66 and in threaded engagement with passageway 68 in pin 64. The adjusting screw 74 is provided with a handle portion 76 and is also provided with a flange or abutment 78 which flange contacts loop 60 thereby urging the two brake bands together and into frictional engagement with the outer surface of drum 40. Belleville washers 80 are provided between the adjusting screw flange 78 and the loop 60 to aid in maintaining the adjusted position of the bands and to compensate for wear.

From the foregoing it is apparent that an operator of the implement shown can adjust the brake bands 48 and 50 by turning adjusting screw 74 by means of handle 76 and without the use of any tools. This adjustment can be made so that substantially no friction force is being applied to axle 22 to prevent castering of wheel 26 or the friction force can be increased until axle 22 is locked relative to frame 12 and no castering of wheel 26 is permitted. In addition, by turning handle 76, the operator can obtain any degree of friction desired to prevent excess castering or wobbling.

The present invention is shown and described as being used on the rear caster wheel of a wheeled moldboard plow; however, the invention is not intended to be limited to this use as the invention could be equally utilized in numerous other applications of caster wheels in ground supported mobile machines. Accordingly while a specific example of the invention has been described and illustrated, it should be understood that various alterations in the construction and arrangement of parts can be made by those skilled in the art.

The embodiments of the invention in which an exclusive property or privilege is claimed are defined as follows:

1. In combination with an implement frame, a caster wheel assembly pivotally received in said frame for providing a support for said frame, said frame providing a sleeve for rotatably receiving the spindle of said caster wheel, the upper end of said spindle extending upwardly beyond said sleeve, a cylindrical collar received about said upper end of said spindle and being attached thereto for pivotal movement therewith, a brake band carried by said frame in surrounding relation to said collar, and means for varying the tension in said brake band for limiting the pivotal movement of said spindle or preventing said pivotal movement.

2. The combination recited in claim 1 wherein said collar member is constructed of dense friction material.

3. The combination recited in claim 2 and wherein the upper end of said spindle is provided with a transversely extending passageway in alignment with passageways in said collar and pin means received in said passageway for attaching said collar to said axle.

4. The combination recited in claim 3 and wherein said pin means is of a length less than the outside diameter of said collar.

5. The combination recited in claim 4 and wherein said collar is of a greater diameter than the internal diameter of said sleeve and thereby retains said spindle against downward movement relative to said frame.

6. The combination recited in claim 1 and wherein said means for varying tension in said brake band is adjustable for a range from providing no resistance to said spindle castering freely to said spindle being locked in fixed position relative to said frame.

References Cited

UNITED STATES PATENTS

| 1,804,333 | 5/1931 | Gregoire. | |
| 2,021,886 | 11/1935 | Carpenter et al. | 188—83 |
| 2,072,787 | 3/1937 | Anderson. | |
| 2,972,163 | 2/1961 | Ross et al. | 16—35 |
| 3,059,706 | 10/1962 | Morkoski et al. | |

KENNETH H. BETTS, Primary Examiner

U.S. Cl. X.R.

16—35; 188—77